(No Model.)

H. McHUGH.
PROCESS OF MAKING ROLLS FOR EMBOSSING PLASTIC MATERIAL.

No. 396,589. Patented Jan. 22, 1889.

Witnesses.
Fred. A. Mason.
Chas. M. Oliver.

Inventor
Hugh McHugh
by F. A. Mason
atty.

United States Patent Office.

HUGH McHUGH, OF NEW BEDFORD, MASSACHUSETTS.

PROCESS OF MAKING ROLLS FOR EMBOSSING PLASTIC MATERIAL.

SPECIFICATION forming part of Letters Patent No. 396,589, dated January 22, 1889.

Application filed December 16, 1887. Serial No. 258,114. (No model.) Patented in England December 31, 1887, No. 18,019.

*To all whom it may concern:*

Be it known that I, HUGH McHUGH, a citizen of the United States, residing at New Bedford, in the county of Bristol and State of Massachusetts, have invented a new and useful Process of Making Rolls for Embossing Plastic Material, (for which I have obtained a patent in Great Britain, No. 18,019, December 31, 1887,) of which the following is a specification.

My invention relates to rolls for embossing strips of plastic material to be used on moldings or for interior decoration. Heretofore such rolls have been produced by engraving the design or pattern in the edge of the roll, thus making them quite expensive.

The object of my invention is to make the production of such rolls much more rapid and cheap, and I attain this object by means of the process hereinafter described.

In practicing my invention I first cut or engrave a complete section of the desired pattern in a block of some hard wood, and by means of that pattern mold several pieces from it in some kind of elastic plastic material. I then place these sections within a ring or cylinder of some suitable metal in such a manner that the sections of the patterns shall exactly match and form a complete figure or strip of ornamentation around the inside of said cylinder. I then by well-known means deposit a skin of copper or other suitable metal more or less thick on the ornamentation. I then introduce a core into the cylinder, taking care that it shall be central therewith, and then pour melted metal or other suitable substance between the core and the skin of copper and allow it to cool or set. This gives a strong backing to the skin of copper. I then remove the copper ornamentation with its backing from the cylinder, and remove from its face the plastic mold and also the core from its center. I then true up the sides of the roll, when it is ready to be placed on an arbor of a machine and be used for embossing strips of plastic material.

Figure 1:
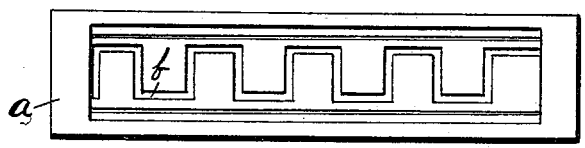
Figure 2:
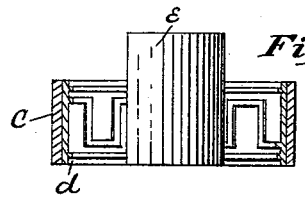
Figure 3:
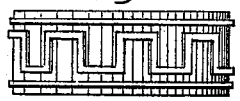

In the accompanying drawings, Figure 1 represents a plan view of the engraved design in a block of wood. Fig. 2 represents a view of the metallic ring in cross-section, with a section of the ornamental or molded plastic material made by means of the engraved block, Fig. 1, placed inside thereof, together with a core placed centrally inside the same. Fig. 3 represents the finished embossing-roll.

In Fig. 1, *a* represents a block in which is engraved the required design *b*. In Fig. 2, *c* represents the metallic ring or cylinder with a strip of ornamented plastic material, *d*, produced by means of Fig. 1, placed inside thereof; and *e* represents the core placed centrally, in order that when the melted metal is poured into the space between the core and the deposited skin of copper on the ornamental strip of plastic material *d*, the opening made by the core *e* may be in the center of the embossing-roll represented by Fig. 3.

Having thus described my invention, what I claim, and desire to secure by Letters Patent, is—

The herein-described process of making rolls for embossing plastic material, by engraving a complete section of the desired pattern or design in wood, taking molds therefrom of elastic plastic material and arranging them around the inside of a cylinder in such a manner as to form a complete strip of ornamentation, then depositing thereon a skin of copper, and then giving the copper skin a suitable backing in order that it may be used on an arbor of a machine for embossing plastic material, as described.

HUGH McHUGH.

Witnesses:
 HENRY W. MASON,
 THOS. M. JAMES.